United States Patent
Komatsu et al.

(10) Patent No.: US 8,687,237 B2
(45) Date of Patent: Apr. 1, 2014

(54) IMAGE PROCESSING METHOD AND APPARATUS THAT CHANGES PIXEL VALUE OF PIXEL OF INTEREST WHEN TRAPPING PROCESSING IS DETERMINED

(75) Inventors: Yasuo Komatsu, Kanagawa (JP); Kouji Yorimoto, Kanagawa (JP); Kiyoshi Une, Kanagawa (JP); Nagamasa Misu, Kanagawa (JP); Takumi Nishikata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 196 days.

(21) Appl. No.: 13/287,563

(22) Filed: Nov. 2, 2011

(65) Prior Publication Data
US 2012/0327479 A1 Dec. 27, 2012

(30) Foreign Application Priority Data

Jun. 23, 2011 (JP) ................................. 2011-139236

(51) Int. Cl.
*H04N 1/407* (2006.01)

(52) U.S. Cl.
USPC ......... 358/3.06; 358/1.9; 358/3.26; 358/3.27; 358/3.28; 358/504; 358/515; 358/518

(58) Field of Classification Search
None
See application file for complete search history.

(56) References Cited

U.S. PATENT DOCUMENTS

| 6,549,303 | B1 * | 4/2003 | Trask | 358/1.9 |
| 6,781,720 | B1 * | 8/2004 | Klassen | 358/3.27 |
| 7,362,467 | B1 | 4/2008 | Tsukimura | |
| 8,340,396 | B2 * | 12/2012 | Yao | 382/149 |
| 2008/0007752 | A1 * | 1/2008 | Gandhi et al. | 358/1.9 |
| 2010/0259771 | A1 * | 10/2010 | Sakamoto | 358/1.2 |
| 2010/0259775 | A1 * | 10/2010 | Sakamoto | 358/1.9 |
| 2011/0188088 | A1 * | 8/2011 | Kawano | 358/3.06 |

FOREIGN PATENT DOCUMENTS

| JP | A-2000-232590 | 8/2000 |
| JP | A-2002-165104 | 6/2002 |

* cited by examiner

*Primary Examiner* — Dung Tran
(74) *Attorney, Agent, or Firm* — Oliff PLC

(57) ABSTRACT

An image processing apparatus includes the following elements. A characteristic value calculator calculates characteristic values of a preset area set around a pixel of interest. A trapping determining unit determines, for each color plane of an N-valued image, on the basis of the calculated characteristic values, whether the pixel of interest is to be subjected to trapping processing. A pixel value calculator sets, for each color plane, a position of a reference pixel in a reference area, and calculates a pixel value for changing the pixel value of the pixel of interest on the basis of a pixel value of each color plane at the position of the reference pixel. A pixel-of-interest value changing unit changes the pixel value of the pixel of interest into the calculated pixel value when the trapping determining unit determines that the pixel of interest is to be subjected to trapping processing.

9 Claims, 12 Drawing Sheets

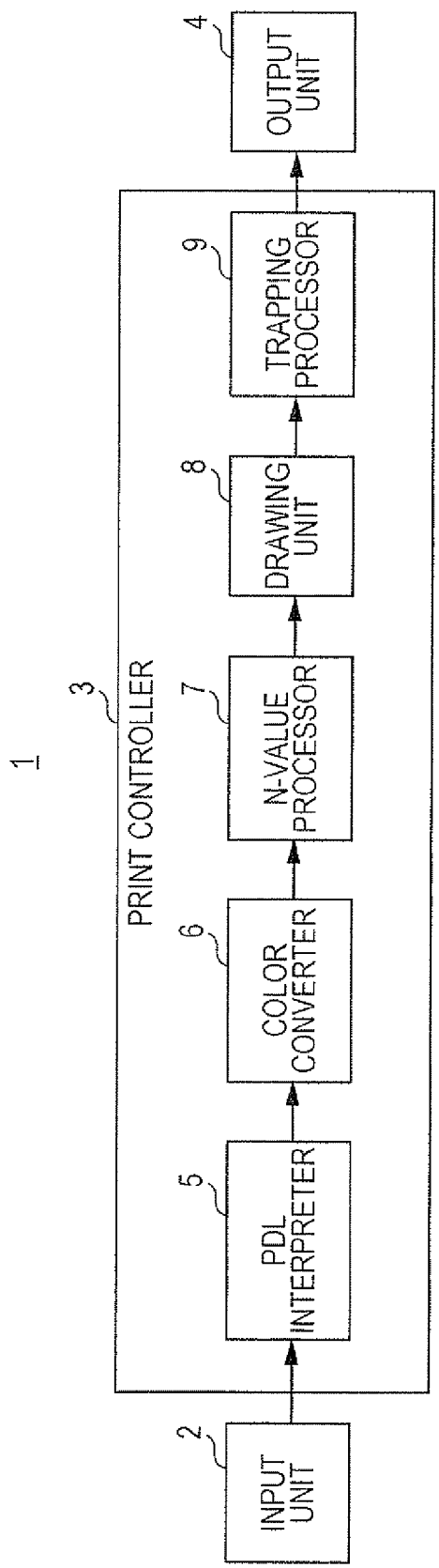
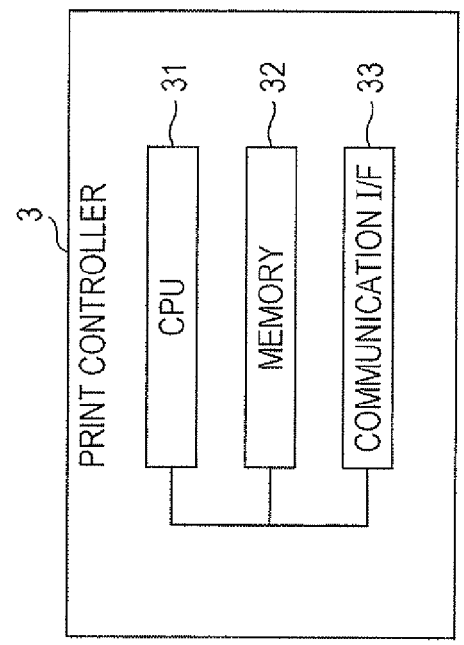

ENLARGE

▥ CYAN (cyan)
▨ BLACK (k)

← BLACK (k) → ← CYAN (cyan) →

50 — PIXEL OF INTEREST

ENLARGE  WHITE GAPS

▥ CYAN (cyan)
▨ BLACK (k)

← BLACK (k) → ←WHITE GAPS→ ← CYAN (cyan) →

50

FIG. 5
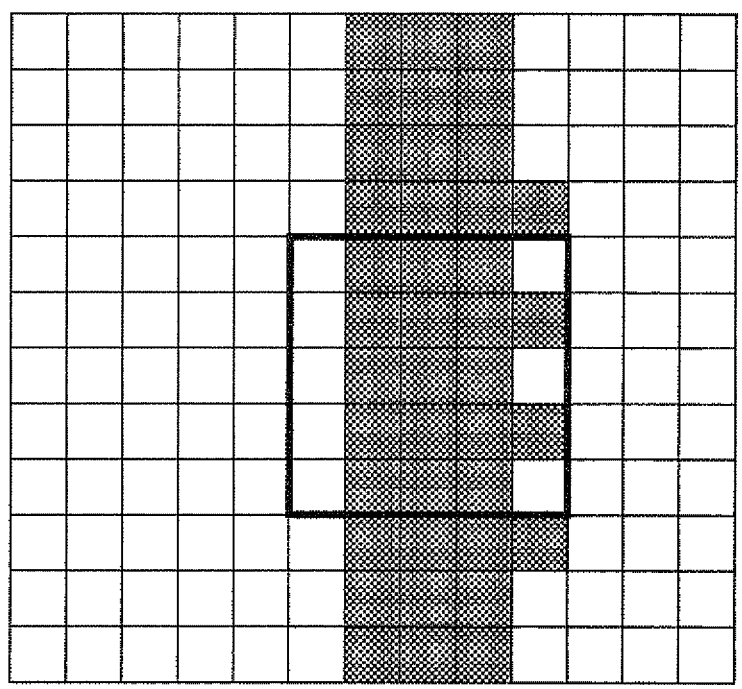
 PIXELS TO BE SUBJECTED TO TRAPPING PROCESSING

K = ON   K = OFF
C = OFF  C = ON

K = ON   K = OFF
C = ON   C = ON

K = ON    K = OFF
C = OFF   C = ON
         K = OFF
         C = OFF

FIG. 9A
FIG. 9B
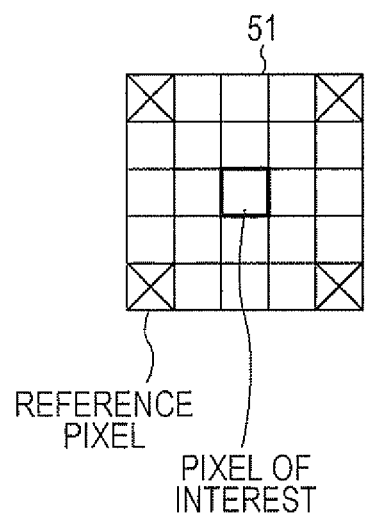
REFERENCE PIXEL
PIXEL OF INTEREST
FIG. 9C
FIG. 9D
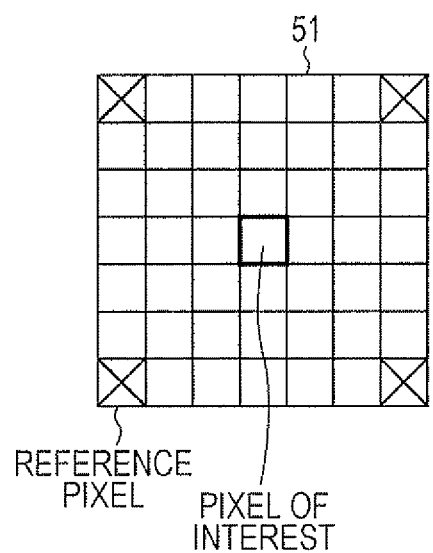
REFERENCE PIXEL
PIXEL OF INTEREST

FIG. 12A

BLACK: K1 (PALE) < K2 < K3 (DARK)
CYAN: C1 (PALE) < C2 < C3 (DARK)

FIG. 12B

BLACK: K1 (PALE) < K2 < K3 (DARK)
CYAN: C1 (PALE) < C2 < C3 (DARK)

FIG. 13A

BLACK: K1 (PALE) < K2 < K3 (DARK)
CYAN: C1 (PALE) < C2 < C3 (DARK)
BLACK + CYAN: L1 (PALE) < L2 < L3 (DARK)

FIG. 13B

BLACK: K1 (PALE) < K2 < K3 (DARK)
CYAN: C1 (PALE) < C2 < C3 (DARK)

IMAGE PROCESSING METHOD AND APPARATUS THAT CHANGES PIXEL VALUE OF PIXEL OF INTEREST WHEN TRAPPING PROCESSING IS DETERMINED

CROSS-REFERENCE TO RELATED APPLICATIONS

This application is based on and claims priority under 35 USC 119 from Japanese Patent Application No. 2011-139236 filed Jun. 23, 2011.

BACKGROUND (i) Technical Field

The present invention relates to image processing apparatuses, image processing methods, and computer readable media.

(ii) Related Art

Color-image printing is performed by superposing plural planes (e.g., cyan (C), magenta (M), yellow (Y), and black (K) planes). In this case, if positions of superposition are displaced from each other between plural planes, there may be some areas whose the background is exposed (such areas are so-called white gaps). This phenomenon is generally referred to as the "misregistration". In order to prevent the occurrence of white gaps, trapping processing may be performed in advance to superpose planes at positions in which white gaps may occur.

SUMMARY

According to an aspect of the invention, there is provided an image processing apparatus including: a characteristic value calculator that calculates characteristic values of a preset area, which has been set around a pixel of interest, on the basis of conditions, each of the conditions being set by using a combination of pixel values of plural color planes of each pixel contained in the preset area; a trapping determining unit that determines, for each of the plural color planes of an N-valued image which has been subjected to halftone processing, on the basis of the characteristic values of the preset area calculated by the characteristic value calculator, whether the pixel of interest is to be subjected to trapping processing; a pixel value calculator that sets, for each of the plural color planes, in a reference area used for analyzing a regularity structure of the N-valued image, a position of a reference pixel which is to be referred to when changing a pixel value of the pixel of interest, and that calculates a pixel value for changing the pixel value of the pixel of interest on the basis of a pixel value of each of the plural color planes at the position of the reference pixel; and a pixel-of-interest value changing unit that changes the pixel value of the pixel of interest positioned in the N-valued image into the calculated pixel value when the trapping determining unit determines that the pixel of interest is to be subjected to trapping processing.

BRIEF DESCRIPTION OF THE DRAWINGS

Exemplary embodiment(s) of the present invention will be described in detail based on the following figures, wherein:

FIGS. 1A and 1B are respectively a block diagram illustrating an example of the configuration of an image processing apparatus according to a first exemplary embodiment and a block diagram illustrating an example of the hardware configuration of a print controller included in the image processing apparatus;

FIG. 5 illustrates an example of a result of determination made by a trapping determining unit included in the trapping processor;

FIGS. 9A, 9B, 9C, and 9D respectively illustrate an example of a fine halftone screen (dither screen), a reference area for analyzing the screen structure shown in FIG. 9A, an example of a rough halftone screen, and a reference area for analyzing the screen structure shown in FIG. 9C;

FIGS. 12A and 12B illustrate a second exemplary embodiment, and more specifically, respectively illustrate an example of a two-bit image (i.e., four-valued image) in which a K plane is not displaced from a C plane and an example of a two-bit image (i.e., four-valued image) in which a K plane is displaced from a C plane by two pixels in the left direction;

FIGS. 13A and 13B respectively illustrate the states of the two-bit images shown in FIGS. 12A and 12B after they have been subjected to trapping processing.

DETAILED DESCRIPTION

Figure 2A:
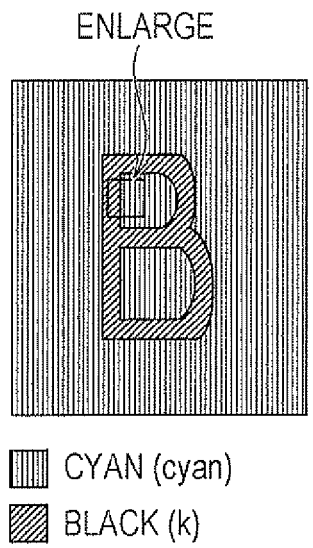
FIGS. 2A and 2B respectively illustrate an example of a binary image subjected to halftone processing and an enlarged portion of a letter (character) and a background of the binary image shown in FIG. 2A.

Exemplary embodiments of the present invention will now be described below with reference to the drawings.

FIG. 1A is a block diagram illustrating the configuration of an image processing apparatus 1 according to a first exemplary embodiment.

In FIG. 1A, the image processing apparatus 1 is, for example, a printer, a copying machine, or a multifunction device. The image processing apparatus 1 includes an input unit 2, a print controller 3, and an output unit 4. The input unit 2 is an interface into which image data is input. The print controller 3 includes, as shown in FIG. 1B, a central processing unit (CPU) 31, a memory 32, and a communication interface (I/F) 33, and performs predetermined image processing on input image data. The output unit 4 outputs image data subjected to image processing onto recording paper.

The print controller 3 includes a page description language (PDL) interpreter 5, a color converter 6, an N-value processor 7 (N is two or greater), a drawing unit 8, and a trapping processor 9. The PDL interpreter 5 interprets a PDL and loads image data. The color converter 6 converts RGB (Red, Green, Blue) data into CMYK data. The N-value processor 7 performs N-value processing (e.g. halftone processing) on image data. The drawing unit 8 accumulates data subjected to N-value processing (N-valued data) and generates a bitmap image. The trapping processor 9 performs trapping processing in order to prevent the occurrence of white gaps in image data.

Figure 2B:
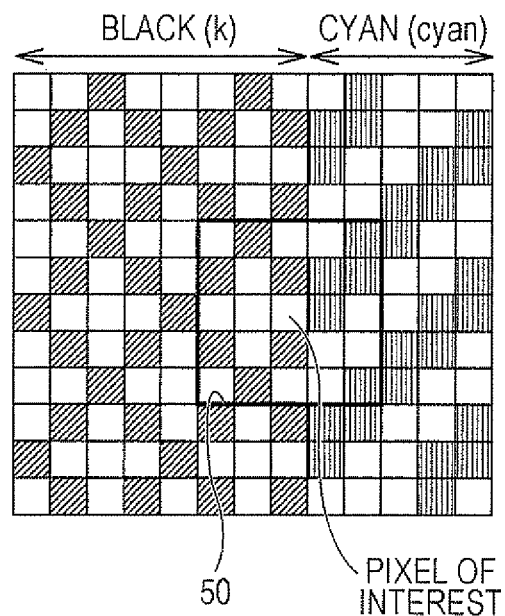
Figure 3A:
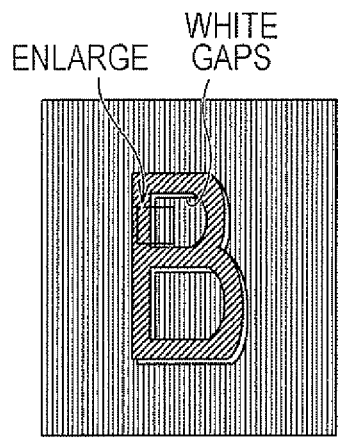
FIGS. 3A and 3B respectively illustrate an example of a binary image subjected to halftone processing in which white gaps occur and an enlarged portion of a letter (character) and a background of the binary image shown in FIG. 3A.
Figure 3B:
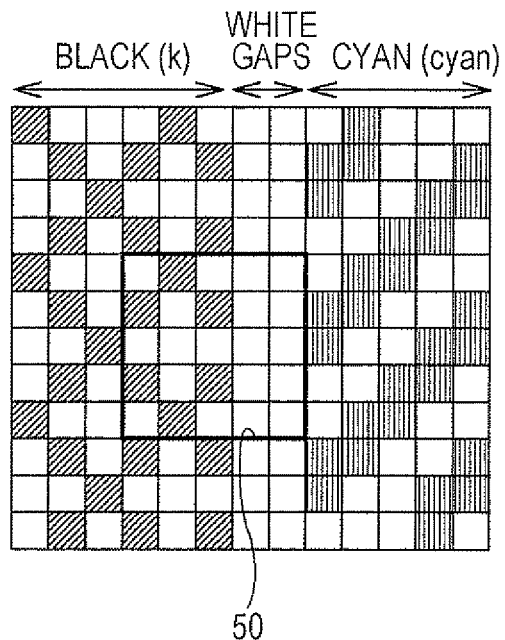

FIG. 2A illustrates a binary image subjected to halftone processing. FIG. 2B is an enlarged view illustrating a certain portion of the letter shown in FIG. 2A. FIG. 3A illustrates a binary image subjected to halftone processing when white gaps have occurred. FIG. 3B is an enlarged view illustrating a certain portion of the letter shown in FIG. 3A.

As shown in FIGS. 2A and 3A, the binary image subjected to halftone processing is constituted of, for example, a black (K) letter "B" and a cyan (C) background. The binary images are formed of dot-like images, as shown in FIGS. 2B and 3B, since they are generated by performing halftone processing, such as dither matrix processing. In such binary images, if print positions of the K plane and the C plane are displaced from each other on recording paper, white gaps occur. White gaps mean that the surface (white color) of recording paper is exposed along the outlines of a letter (character) due to misregistration between color planes. FIGS. 3A and 3B illustrate an example in which the K plane is displaced from the C plane by two pixels in the left direction. It is noted that color planes, such as a K plane and a C plane, are also called color plates.

In the following description, it is assumed that trapping processing is performed on the two dots between the two K and C planes along the outline of the letter. It is also assumed that image data input into the trapping processor 9 is binary image data subjected to halftone processing.

Figure 4:
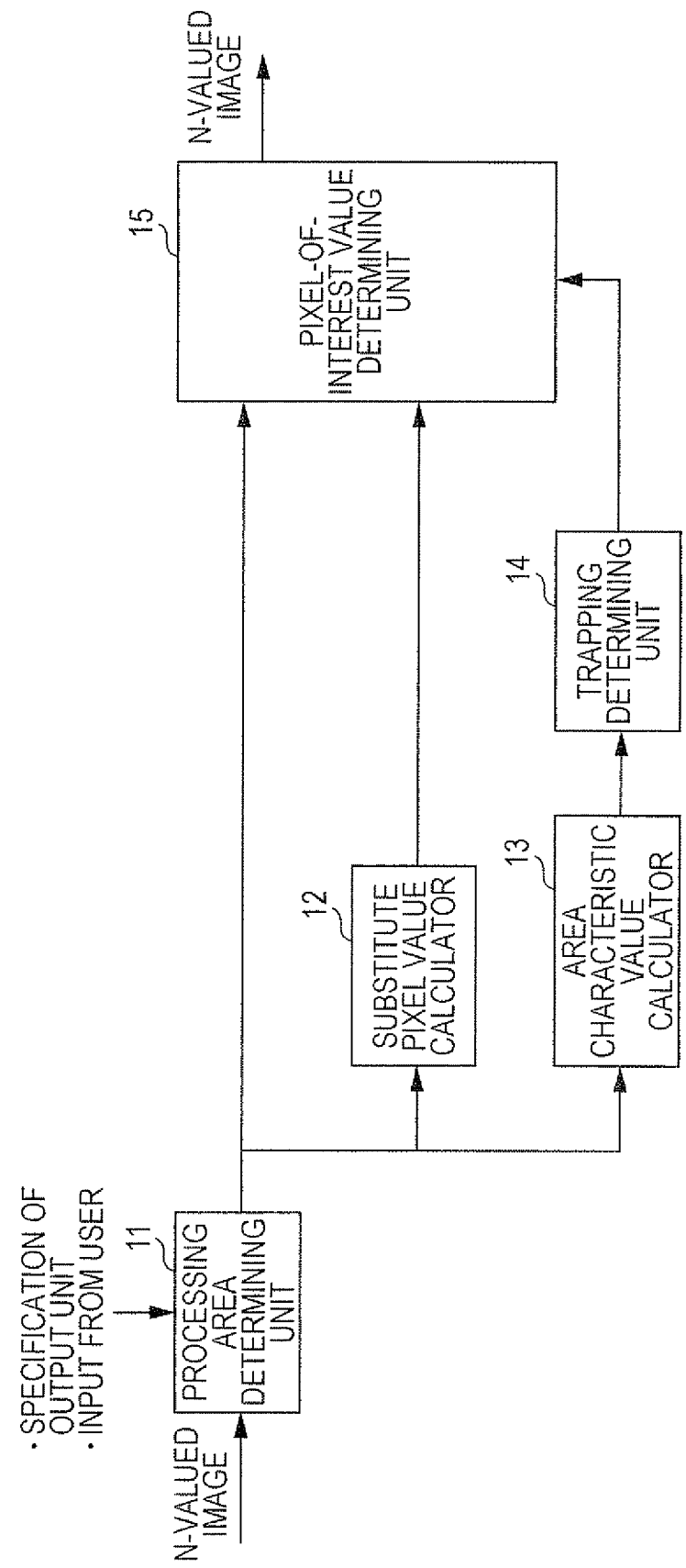
FIG. 4 is a block diagram illustrating an example of the configuration of a trapping processor included in the image processing apparatus.

FIG. 4 is a block diagram illustrating the configuration of the trapping processor 9.

The trapping processor 9 includes a processing area determining unit 11 (changing unit), a substitute pixel value calculator 12 (pixel value calculator), an area characteristic value calculator 13 (characteristic value calculator), a trapping determining unit 14, and a pixel-of-interest value determining unit 15 (pixel-of-interest value changing unit).

Upon receiving a binary image, as shown in FIG. 2B, the processing area determining unit 11 determines, as a processing area 50, an area of 5 (dots)×5 (dots) in which the center pixel is set as the pixel of interest. The processing area 50 is not restricted to a 5 (dot)×5 (dot) area, and may be a 3 (dot)×3 (dot) area or a 7 (dot)×7 (dot) area.

The substitute pixel value calculator 12 calculates a substitute pixel value of the pixel of interest on the basis of the characteristics of the pixel arrangement of the processing area 50 of the binary image. The area characteristic value calculator 13 calculates the characteristic values of the processing area 50. The trapping determining unit 14 determines on the basis of the characteristic values of the processing area 50 whether the pixel of interest is to be subjected to trapping processing. The pixel-of-interest value determining unit 15 determines the value of the pixel of interest to be output from the trapping processor 9 in accordance with the pixel value of the pixel of interest positioned within the input binary image, the output value from the trapping determining unit 14, and the output value from the substitute pixel value calculator 12.

A technique for determining the size of the processing area 50 will be described below.

It will now be assumed that the processing area 50 is constituted of a 5 (dot)×5 (dot) matrix and the pixel of interest is positioned at an edge on the inside of the black (k) letter (see FIGS. 2B and 3B). In this case, if white gaps are constituted of two dots or less, the processing area 50 can be utilized. In contrast, if white gaps are constituted of three or more dots, the processing area 50 cannot be utilized. The reason for this is as follows. If a cyan pixel is contained in the processing area 50, the pixel of interest is substituted to the cyan pixel. Therefore, white gaps of two or less dots can be prevented. However, if a cyan pixel is not contained in the processing area 50, the pixel of interest is not substituted to the cyan pixel. Therefore, white gaps of three or more dots cannot be prevented. Accordingly, the processing area 50 constituted of a 5 (dot)×5 (dot) matrix can be utilized if trapping processing is performed on two or less dots of an outline of an object, such as a character, a letter, or a numerical value.

Similarly, if the processing area 50 is constituted of a 3 (dot)×3 (dot) matrix, it can be utilized when trapping processing is performed on one dot of the outline of the processing area 50. If the processing area 50 is constituted of a 7 (dot)×7 (dot) matrix, it can be utilized when trapping processing is performed on three or less dots of the outline of the processing area 50.

In this manner, the dot width to be subjected to trapping processing can be changed in accordance with the size of the processing area 50. When trapping processing is performed, it is necessary to determine the dot width of the outline of an object to be subjected to trapping processing. The dot width may be set in advance by using the size of misregistration which can be assumed from the specification of the output unit 4. Accordingly, upon receiving information concerning the specification of the output unit 4 from the output unit 4, the processing area determining unit 11 determines the size of the processing area 50. Alternatively, the processing area determining unit 11 may determine the size of the processing area 50 on the basis of an input (e.g., an instruction to select a 5 (dot)×5 (dot) area) from a user.

A description will now be given of a technique for determining whether each of the pixels forming an input binary image is to be subjected to trapping processing.

The area characteristic value calculator 13 first calculates the following characteristic values by referring to the processing area 50.

(1) The number of pixels which satisfy a first condition, i.e., K=ON and C=OFF and M=OFF and Y=OFF, is calculated. That is, the "number of K pixels" is calculated. K=ON and C=OFF and M=OFF and Y=OFF is the first condition for calculation of the characteristic values by the area characteristic value calculator 13.

(2) The number of pixels which satisfy a second condition, i.e., C=ON and K=OFF, is calculated. That is, the "number of C pixels" is calculated. In the processing of the C plane, C=ON and K=OFF is the second condition for calculation of the characteristic values by the area characteristic value calculator 13. In the processing of the M plane, M=ON and K=OFF is the second condition for calculation of the characteristic values by the area characteristic value calculator 13. The number of pixels which satisfy M=ON and K=OFF is referred to as the "number of M pixels". In the processing of the Y plane, Y=ON and K=OFF is the second condition for calculation of the characteristic values by the area characteristic value calculator 13. The number of pixels which satisfy Y=ON and K=OFF is referred to as the "number of Y pixels".

The number of K pixels is the number of pixels having a single color of K. The number of C pixels is the number of C pixels which do not overlap K. In FIG. 2B, in the processing area 50, the number of K pixels is 6 and the number of C pixels is 5. This result is sent to the trapping determining unit 14.

The trapping determining unit 14 determines on the basis of a result of calculation made by the area characteristic value calculator 13 whether the number of K pixels is equal to or greater than a number-of-K-pixels threshold and whether the number of C pixels is equal to or greater than a number-of-C-pixels threshold. If those conditions are satisfied, the trapping determining unit 14 determines that the pixel of interest is to be subjected to trapping processing. That is, by comparing the two characteristic values, i.e., the number of K pixels and the number of C pixels, with the corresponding thresholds, the trapping determining unit 14 determines whether K pixels are adjacent to each other and whether C pixels are adjacent to each other, i.e., whether white gaps are noticeable. Those two thresholds (i.e., the number-of-K-pixels threshold and the number-of-C-pixels threshold) are determined in advance in accordance with the characteristics of halftone processing and conditions for trapping processing. In this exemplary embodiment, the number-of-K-pixels threshold is set to be 3 and the number-of-C-pixels threshold is set to be 1. The above-described determination (whether or not the pixel of interest is to be subjected to trapping processing) is made for all the pixels forming the binary image shown in FIG. 2B. The determination result when those two thresholds are used is shown in FIG. 5. The trapping determining unit 14 detects, as shown in FIG. 5, pixels to be subjected to trapping processing in the boundary between the letter and the background of the binary image, and sends the detection result to the pixel-of-interest value determining unit 15.

A technique for determining the number-of-K-pixels threshold and the number-of-C-pixels threshold is as follows.

Figure 6A:
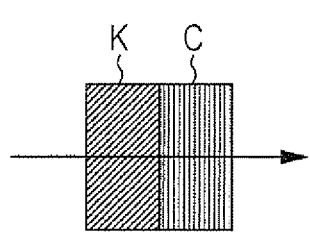
FIGS. 6A, 6B, and 6C respectively illustrate an example of an image in which black (K) and cyan (C) are adjacent to each other, an example of an image in cross section in which K and C are adjacent to each other, and another example of an image in cross section in which K and C are adjacent to each other.
Figure 6B:
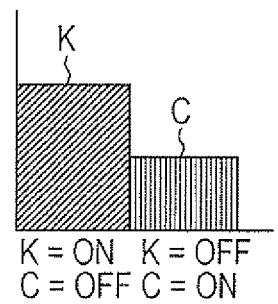
Figure 6C:
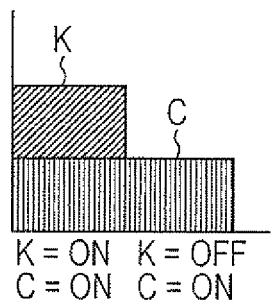
Figure 7A:
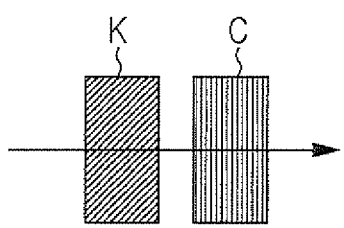
FIGS. 7A and 7B respectively illustrate an example in which K and C are separate from each other and an example of an image in cross section in which K and C are separate from each other.
Figure 7B:
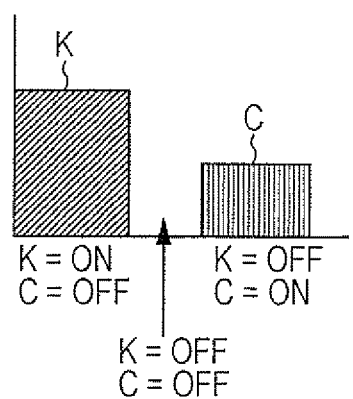

Since white gaps occur due to misregistration between color planes, it is necessary to detect in what way the color planes are adjacent to each other. FIG. 6A illustrates an example of an image in which K and C are adjacent to each other. FIG. 6B illustrates an example of an image in cross section in which K and C are adjacent to each other. FIG. 6C illustrates another example of an image in cross section in which K and C are adjacent to each other. FIG. 7A illustrates an example of an image in which K and C are separate from each other. FIG. 7B illustrates an example of an image in cross section in which K and C are separate from each other.

In the image in which K and C are adjacent to each other, as shown in FIG. 6A, there are cases where trapping processing is necessary and there are cases where trapping processing is not necessary. If misregistration occurs in a state in which K and C do not overlap, as shown in FIG. 6B, white gaps occur. In this case, therefore, trapping processing is necessary. In contrast, if misregistration occurs in a state in which K and C overlap, as shown in FIG. 6C, white gaps do not occur. In this case, therefore, trapping processing is not necessary. In images in which K and C are separate from each other, as in those shown in FIGS. 7B and 7C, it is totally normal that the background is exposed, and thus, trapping processing is not necessary.

As described above, the number of K pixels is the number of pixels which satisfy the first condition (K=ON and C=OFF and M=OFF and Y=OFF) in the processing area 50, and the number of C pixels is the number of pixels which satisfy the second condition (K=OFF and C=ON) in the processing area 50. Accordingly, if the number of K pixels in the processing area 50 is large, the processing area 50 is positioned within or in the outline of the K rectangle shown in FIG. 6B or 78. If the number of C pixels in the processing area 50 is large, the processing area 50 is positioned in the outline of the K rectangle shown in FIG. 6B. If the number of C pixels in the processing area 50 is 0, the processing area 50 is positioned within the K rectangle shown in FIG. 6B or it is positioned within or in the outline of the K rectangle shown in FIG. 7B. Thus, the trapping determining unit 14 sets the number-of-K-pixels threshold and the number-of-C-pixels threshold to one or greater so that it can detect an outline to be subjected to trapping processing.

The number of K pixels and the number of C pixels represent the density of the K plane and that of the C plane, respectively. The number-of-K-pixels threshold and the number-of-C-pixels threshold serve as control values for controlling how likely it will be for trapping processing to be performed. When the number-of-K-pixels threshold and the number-of-C-pixels threshold are one, it is more likely that trapping processing is to be performed, but on the other hand, it is also more likely that erroneous determinations will be made. Thus, when determining the number-of-K-pixels threshold and the number-of-C-pixels threshold by using the trapping determining unit 14, it is necessary to consider the following conditions (1) through (3).

(1) Distribution of K pixels and C pixels: for example, whether K pixels are present only within a letter (character), or whether K pixels are present around the letter (character), together with C pixels, as well as within a letter (character).

(2) Size of the processing area 50: for example, the number-of-K-pixels threshold and the number-of-C-pixels threshold when the processing area 50 is a 5 (dot)×5 (dot) area are set to be greater than those when the processing area 50 is a 3 (dot)×3 (dot) area.

(3) Type of binarizing screen: the number-of-K-pixels threshold and the number-of-C-pixels threshold are changed in accordance with the density of the screen.

By considering those conditions, the trapping determining unit 14 determines the number-of-K-pixels threshold and the number-of-C-pixels threshold for each printing condition, and retains the determined thresholds as set values. Then, when printing is performed, the trapping determining unit 14 selects the number-of-K-pixels threshold and the number-of-C-pixels threshold in accordance with the printing condition. Alternatively, the trapping determining unit 14 may determine in advance the number-of-K-pixels threshold and the number-of-C-pixels threshold when the processing area 50 is a 5 (dot)×5 (dot) area, and may change automatically the number-of-K-pixels threshold and the number-of-C-pixels in accordance with the size of the processing area 50 to be used when printing is performed.

A description will now be given of a technique for calculating a substitute pixel value for a pixel which is determined to be subjected to trapping processing.

Figure 8A:
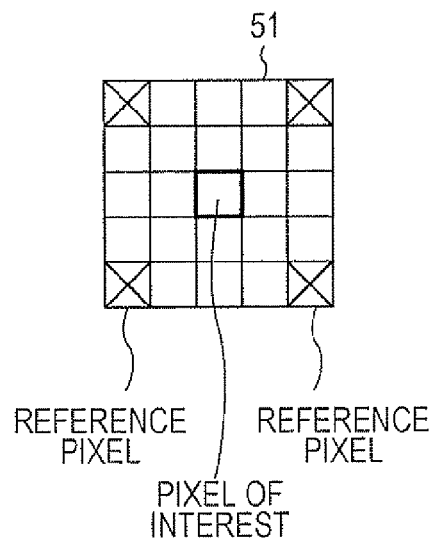
FIGS. 8A, 8B, and 8C respectively illustrate an example of the positions of reference pixels, an example of the state in which a reference area is overlaid on a binary image, and another example of the state in which a reference area is overlaid on a binary image.

The substitute pixel value calculator 12 sets a reference area 51 and calculates a substitute pixel value for the pixel of interest from the characteristics of the pixel arrangement of the set reference area 51. The substitute pixel value calculator 12 determines the reference area 51 in which the pixel arrangement is referred to, by considering the characteristics of the binary image. In this example, the substitute pixel value calculator 12 uses the reference area 51 having the same size (5 (dot)×5 (dot) area) as the processing area 50 used for determining whether trapping processing is to be performed. The substitute pixel value calculator 12 first sets, as shown in FIG. 8A, the positions of reference pixels. The reference pixels are reference pixels which are highly likely to be ON when the pixel of interest is ON, and the positions of the reference pixels are calculated on the basis of the regularity of the dither matrix which has been used when the input image has been binarized. In the example shown in FIG. 8A, in the 5 (dot)×5 (dot) area, the four pixels with the cross mark (X) are specified as reference pixels on the basis of the regularity of the cyan (C) dot pattern.

Figure 8B:
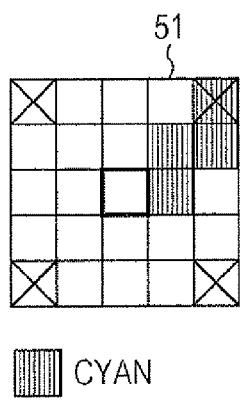
Figure 8C:
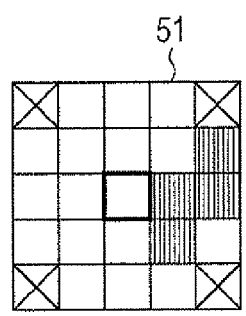

The substitute pixel value calculator 12 calculates the number of reference pixels which are ON and compares such reference pixels with a predetermined threshold (hereinafter referred to as the "number-of-cyan-reference-pixels threshold"). If the number of reference pixels which are ON is equal to or greater than the number-of-cyan-reference-pixels threshold, the substitute pixel value for the pixel of interest is determined to be ON. If the number of reference pixels which are ON is smaller than the number-of-cyan-reference-pixels threshold, the substitute pixel value for the pixel of interest is determined to be OFF. The substitute pixel value calculator 12 supplies this determination result to the pixel-of-interest value determining unit 15. In this exemplary embodiment, the number-of-cyan-reference-pixels threshold is set to be one. That is, if, among the four reference pixels, one cyan pixel is ON, the substitute pixel value calculator 12 sets the substitute pixel value for the pixel of interest is to be ON. In the example shown in FIG. 8B, since the reference pixel on the top right is ON, the substitute pixel value for the pixel of interest is turned ON. In contrast, in the example shown in FIG. 8C, since all the reference pixels are OFF, the substitute pixel value for the pixel of interest is turned OFF. The substitute pixel value calculator 12 calculates the substitute pixel values for all the pixels forming the input binary image. By utilizing this calculation technique, the characteristics (i.e., the regularity of the number of lines per inch and the angle) of cyan of the input binary image can be maintained as they are.

Techniques for determining positions of reference pixels are as follows. The positions of the reference pixels may be determined (1) by a dither matrix structure, (2) by image analysis, or (3) empirically.

Reference will first be given of the technique (1) for determining the positions of the reference pixels by the dither matrix structure.

An image binarized by performing dithering processing always has a screen structure (i.e., a regularity structure). If the number of ON pixels is increased in disorder when substituting the pixels of interest, the outline of the image to be subjected to trapping processing is highlighted. Thus, it is necessary to determine the values of the pixels of interest that allow the original screen structure of the binary image to be maintained. If the pixel of interest is determined to be a pixel to be subjected to trapping processing, an image having a screen structure may be present around the pixel of interest. Then, the substitute pixel value calculator 12 determines the screen structure of the binary image by referring to the pixels around the pixel of interest.

FIG. 9A illustrates an example of a fine halftone screen (dither screen). FIG. 9B illustrates the reference area 51 for analyzing the screen structure. The numbers shown in FIG. 9A is the order in which the pixels are turned ON. In this dither screen, if the four pixels with the cross mark (X) shown in FIG. 9B are ON, the screen structure is maintained even when the pixel of interest is turned ON. In contrast, if the four pixels with the cross mark (X) shown in FIG. 9B are OFF, the screen structure is disturbed when the pixel of interest is turned ON. Thus, the substitute pixel value calculator 12 sets the 5 (dot)×5 (dot) reference area 51, and in order to turn ON the pixel of interest, the substitute pixel value calculator 12 determines the number of pixels which are to be ON (number-of-ON-pixels threshold) among the four pixels of the reference area 51. This number-of-ON-pixels threshold is set to be from 1 to 4. As a smaller threshold is set, the pixel of interest is more likely to be turned ON, thereby performing trapping processing more effectively. On the other hand, it is also likely that erroneous determinations will be made. Thus, the threshold is determined by considering the tradeoff between the effect of trapping processing and erroneous determinations.

FIG. 9C illustrates an example of a rough halftone screen. FIG. 9D illustrates the reference area 51 for analyzing the screen structure. In the screen shown in FIG. 9C, if the substitute pixel value calculator 12 sets a 5 (dot)×5 (dot) reference area as the reference area 51, it is not possible to determine the screen structure of the binary image. Accordingly, the substitute pixel value calculator 12 sets, as shown in FIG. 9D, a 7 (dot)×7 (dot) reference area as the reference area 51. The technique for determining the pixel of interest is similar to that described above.

In this manner, the substitute pixel value calculator 12 is able to determine the size of the reference area 51 and the positions of the reference pixels in order to analyze the screen structure. If the substitute pixel value calculator 12 identifies the screen used for binarizing the input image in advance, it can determine the positions of the reference pixels by using information concerning the screen. If only one type of screen is used in the image processing apparatus 1, the substitute pixel value calculator 12 may use the positions of the predetermined reference pixels as fixed positions. If plural screens are used in the image processing apparatus 1, the substitute pixel value calculator 12 may determine the positions of the reference pixels in the following manner. The substitute pixel value calculator 12 may calculate the screen structure (regularity structure) on the basis of information concerning the screen to be used. Alternatively, the substitute pixel value calculator 12 may retain positional information concerning the positions of the reference pixels for each screen to be used, and may switch the positions of the reference pixels in accordance with the screen to be used.

Then, the technique (2) for determining the positions of the reference pixels by image analysis will be discussed below.

If the substitute pixel value calculator 12 has not identified the screen used for binarizing the input image, it estimates the positions of the reference pixels by analyzing the binary image. For example, when a certain pixel is ON, the substitute pixel value calculator 12 calculates, for each of the CMYK planes, the probability of each of the pixels around the certain pixel being ON, and sets pixels having high probability levels as the reference pixels.

Then, the technique (3) for determining the positions of the reference pixels empirically will be discussed below.

If the screen used for binarizing the input image is a screen without a regularity structure, such as a random dithering screen, the user empirically changes the reference positions to determine the most effective positions. If the positions of the reference pixels are determined empirically, this technique (3) may be combined with the above-described technique (1) or (2). In this case, after provisionally determining the positions of the reference pixels, the user adjusts the positions of the reference pixels by actually seeing a print result.

Although in this exemplary embodiment four reference pixels are specified, the number of reference pixels may be increased. For example, in the case of a dither matrix (screen structure) formed with a combination of a fine regularity and a rough regularity, the number of reference pixels may be increased to eight. Additionally, in this exemplary embodiment, the positions of the reference pixels are determined on the basis of the number of ON pixels. However, the positions of the pixels may be prioritized, and then, the positions of the reference pixels may be determined.

Then, a technique for determining the value of a pixel of interest will be discussed.

The pixel-of-interest value determining unit 15 determines the value of the pixel of interest to be output from the trapping processor 9 on the basis of the pixel value corresponding to the pixel of interest positioned in the input binary image, the output value from the trapping determining unit 14, and the output value from the substitute pixel value calculator 12 in accordance with the following conditions (1) through (4).

(1) If the trapping determining unit 14 determines that the pixel of interest is not a pixel to be subjected to trapping processing, the pixel-of-interest value determining unit 15 outputs the value of the pixel of interest positioned in the input binary image as it is.

(2) If the trapping determining unit 14 determines that the pixel of interest is a pixel to be subjected to trapping processing and if the output value from the substitute pixel value calculator 12 is OFF, the pixel-of-interest value determining unit 15 outputs the value of the pixel of interest positioned in the input binary image as it is.

(3) If the trapping determining unit 14 determines that the pixel of interest is a pixel to be subjected to trapping processing, and if the output value from the substitute pixel value calculator 12 is ON, and if the value of the pixel of interest positioned in the input binary image is OFF, the pixel-of-interest value determining unit 15 outputs "ON" as the value of the pixel of interest. In this case, the value of the pixel of interest is changed from OFF to ON. For example, if the pixel of interest indicates white, which is the color of the background, it is changed to cyan.

(4) If the trapping determining unit 14 determines that the pixel of interest is a pixel to be subjected to trapping processing, and if the output value from the substitute pixel value calculator 12 is ON, and if the value of the pixel of interest positioned in the input binary image is ON, the pixel-of-interest value determining unit 15 outputs "ON" as the value of the pixel of interest. In this case, the value of the pixel of interest is not changed.

Figure 10A:
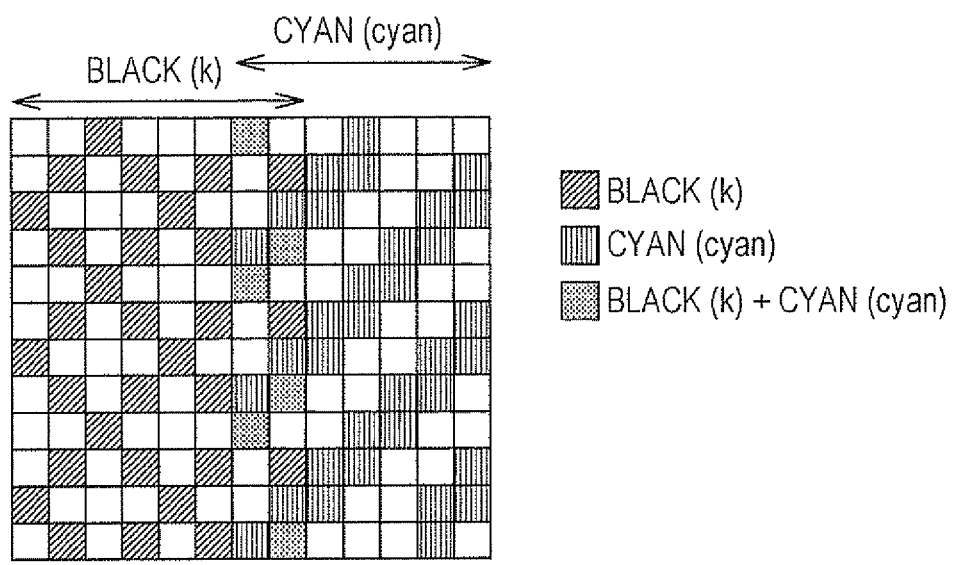
FIGS. 10A and 10B respectively illustrate the states of the binary images shown in FIGS. 2B and 3B after they have been subjected to trapping processing.
Figure 10B:
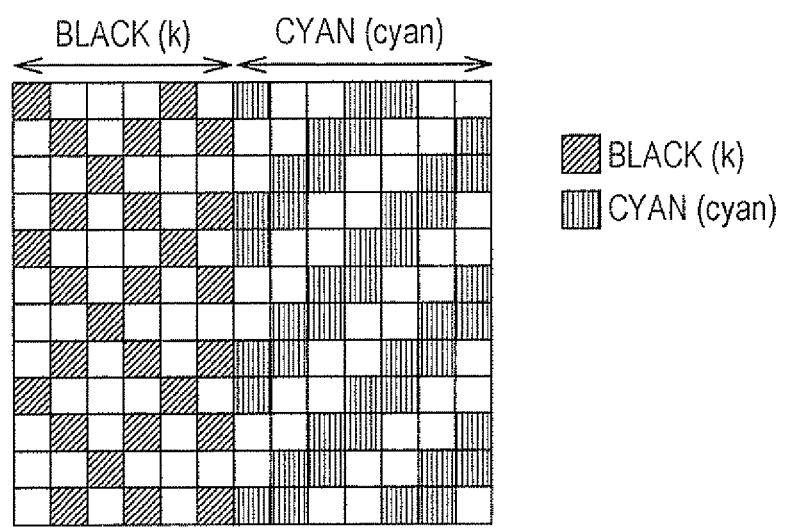

The states of the binary images which have been subjected to trapping processing are shown in FIGS. 10A and 10B. FIG. 10A illustrates the state of the binary image shown in FIG. 2B (i.e., the binary image in which the K plane is not displaced from the C plane) which has been subjected to trapping processing. FIG. 10B illustrates the state of the binary image shown in FIG. 3B (i.e., the binary image in which the K plane is displaced from the C plane by two pixels in the left direction) which has been subjected to trapping processing.

After performing trapping processing, in the binary image in which the K plane is not displaced from the C plane, several pixels in which K and C colors are superposed are generated, as shown in FIG. 10A. This is because the pixels which are determined to be subjected to trapping processing by the trapping determining unit 14 are present, not only in the outline of the letter (character), but also in the background. However, because of the processing performed by the substitute pixel value calculator 12 and the pixel-of-interest value determining unit 15, trapping processing does not influence the characteristics (the regularity of the number of lines per inch, the angle, etc.) of cyan (C) of the binary image. Thus, problems do not occur.

In the binary image in which the K plane is displaced from the C plane by two pixels in the left direction, as shown in FIG. 10B, white gaps do not occur because of trapping processing performed by the trapping processor 9. The processing area determining unit 11, the substitute pixel value calculator 12, the area characteristic value calculator 13, the trapping determining unit 14, and the pixel-of-interest value determining unit 15 perform processing on the magenta (M) plane and the yellow (Y) plane in a manner similar to the processing performed on the cyan (C) plane. As a result, white gaps do not occur around the black letter (character).

Figure 11:
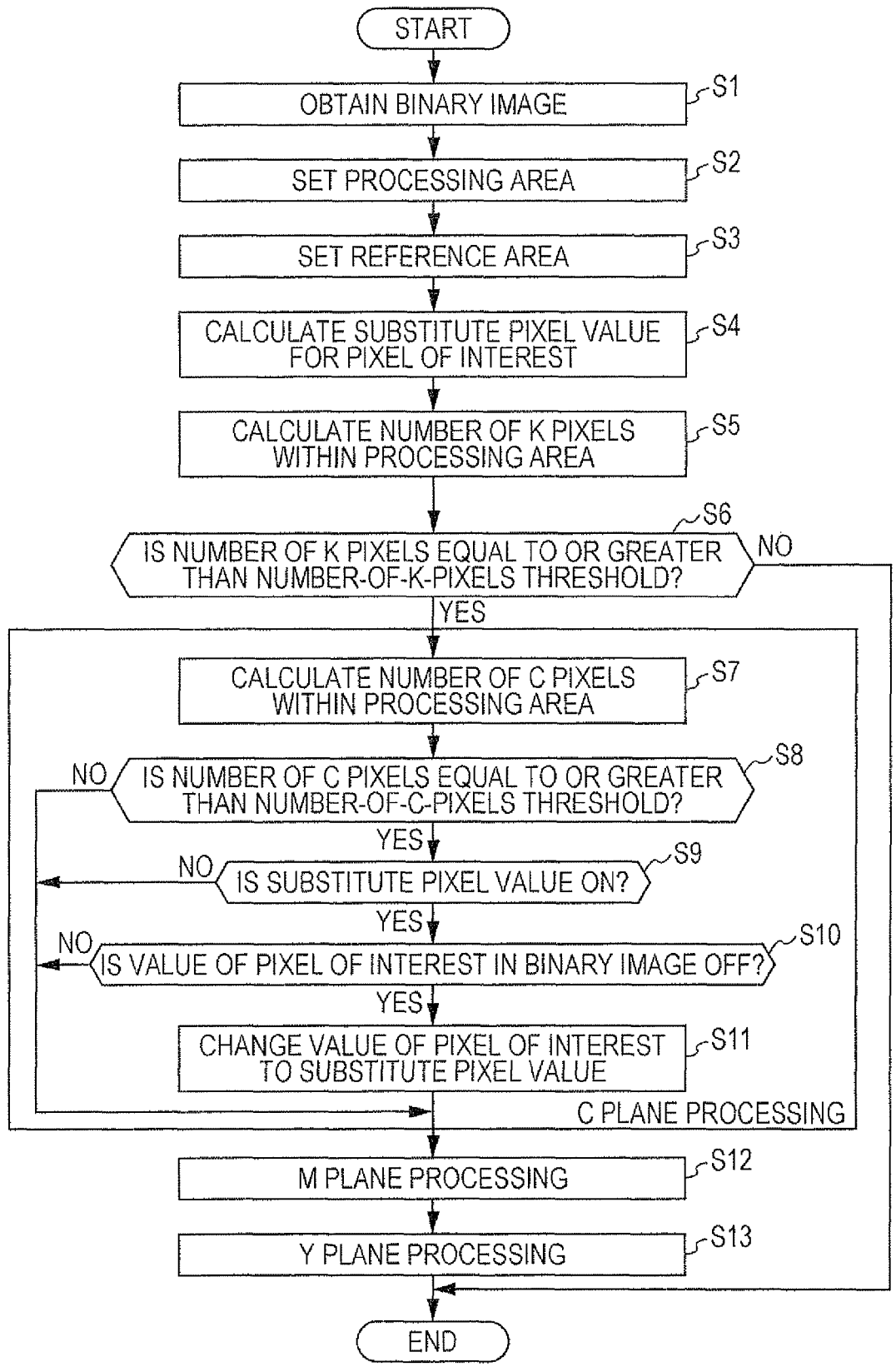
FIG. 11 is a flowchart illustrating processing performed by the trapping processor.

FIG. 11 is a flowchart illustrating processing performed by the trapping processor 9.

In step S1, the processing area determining unit 11 obtains a binary image. Then, in step S2, the processing area determining unit 11 sets the processing area 50. In step S3, the substitute pixel value calculator 12 sets the reference area 51 for analyzing the screen structure of the obtained binary image. Then, in step S4, the substitute pixel value calculator 12 calculates a substitute pixel value for a pixel of interest from the characteristics of the pixel arrangement of the binary image of the reference area 51. In step S5, the area characteristic value calculator 13 calculates the number of K pixels within the processing area 50. In step S6, the trapping determining unit 14 determines whether the number of K pixels calculated by the area characteristic value calculator 13 is equal to or greater than the number-of-K-pixels threshold. If the result of step S6 is NO, the process is completed. If the result of step S6 is YES, the process proceeds to step S7. In step S7, the area characteristic value calculator 13 calculates the number of C pixels within the processing area 50. In step S8, the trapping determining unit 14 determines whether the number of C pixels calculated by the area characteristic value calculator 13 is equal to or greater than the number-of-C-pixels threshold.

If the result of step S8 is NO, the process proceeds to step S12 in which M plane processing is performed, which will be discussed later. If the result of step S8 is YES, the process proceeds to step S9. In step S9, the pixel-of-interest value determining unit 15 determines whether the output value from the substitute pixel value calculator 12 is ON (i.e., the substitute pixel value=ON). If the result of step S9 is NO, the process proceeds to step S12 in which M plane processing is performed, which will be discussed later. If the result of step S9 is YES, the process proceeds to step S10. In step S10, the pixel-of-interest value determining unit 15 determines whether the value of the pixel of interest within the input binary image is OFF. If the result of step S10 is NO, the process proceeds to step S12 in which M plane processing is performed, which will be discussed later. If the result of step S10 is YES, the process proceeds to step S11. In step S11, the pixel-of-interest value determining unit 15 changes the value of the pixel of interest to the substitute pixel value. Steps S7 through S11 are called "C plane processing". After step S11, in step S12, processing similar to the processing of steps S7 through S11 is performed on magenta (M) (M plane processing). In step S13, processing similar to the processing of steps S7 through S11 is performed on yellow (Y) (Y plane processing). The processing is then completed.

As described above, according to the first exemplary embodiment, the following processing is performed. The area characteristic value calculator 13 calculates the characteristic values of the processing area 50, which has been set around a pixel of interest, on the basis of the conditions (i.e., (1) K=ON and C=OFF and M=OFF and Y=OFF and (2) C=ON and K=OFF) set by using combinations of the pixel values of the plural color plates of the pixels contained in the processing area 50. The trapping determining unit 14 then determines, for each of the color plates of the binary image subjected to halftone processing, on the basis of the characteristic values calculated by the area characteristic value calculator 13, whether the pixel of interest is a pixel to be subjected to trapping processing. The substitute pixel value calculator 12 sets in the reference area 51, for each of the color plates, the positions of reference pixels which are to be referred to when changing the value of the pixel of interest, and then calculates the value of the pixel of interest on the basis of the pixel values of the reference pixels for each color plate. When the trapping determining unit 14 determines that the pixel of interest is a pixel to be subjected to trapping processing, the pixel-of-interest value determining unit 15 changes the pixel value of the pixel of interest positioned in the binary image into the pixel value calculated by the substitute pixel value calculator 12. Thus, by using a simple technique, trapping processing can be applied to a binary image subjected to halftone processing.

Second Exemplary Embodiment

In the first exemplary embodiment, input image data is a binary image subjected to screen processing. In a second exemplary embodiment, input image data is a two-bit image (i.e., a four-valued image) subjected to four-valued screen processing. An image processing apparatus of the second exemplary embodiment is similar to the image processing apparatus 1 of the first exemplary embodiment.

In the following description, as in the first exemplary embodiment, it is assumed that trapping processing is to be performed on the width of two dots along a letter (character) between the two color planes, i.e., the K plane and the C plane.

The two-bit image subjected to screen processing has four pixel values (00, 01, 10, 11 in binary notation). For example, if the two-bit image is pale, the number of pixel values "00" "11" which occupy the two-bit image is relatively large. As the two-bit image becomes darker, the number of pixel value "10" which occupies the two-bit image increases, and as the two-bit image becomes further darker, the number of pixel value "11" which occupies the two-bit image increases. If the two-bit image is a so-called solid image, it is constituted of K pixels and C pixels having the pixel values "11". Examples of two-bit images subjected to screen processing are shown in FIGS. 12A and 12B. FIG. 12A illustrates a two-bit image in which the K plane is not displaced from the C plane. FIG. 12B illustrates a two-bit image in which the K plane is displaced from the C plane by two pixels in the left direction. In FIGS. 12A and 12B, the density levels of black (K1, K2, K3) and the density levels of cyan (C1, C2, C3) correspond to the pixel values "01", "10", and "11", respectively. The pixel value "00" represents the density level "0".

In a manner similar to the first exemplary embodiment, upon receiving a two-bit image, the processing area determining unit 11 sets, as shown in FIG. 12A, as the processing area 50, a 5 (dot)×5 (dot) area in which the center pixel is set as the pixel of interest. The image data representing the processing area 50 is supplied to the area characteristic value calculator 13 and the substitute pixel value calculator 12. The technique for determining the size of the processing area 50 is similar to that of the first exemplary embodiment.

A description will now be given of a technique for determining whether each of the pixels forming the input two-bit image is to be subjected to trapping processing.

The area characteristic value calculator 13 first calculates the following characteristic values by referring to the processing area 50.

(1) The number of pixels which satisfy a first condition, i.e., K=11 and C=00 and M=00 and Y=00, is calculated. That is, the "number of first K pixels" is calculated. K=11 and C=00 and M=00 and Y=00 is the first condition for calculation of the characteristic values by the area characteristic value calculator 13.

(2) The number of pixels which satisfy a second condition, i.e., K=10 and C=00 and M=00 and Y=00, is calculated. That is, the "number of second K pixels" is calculated. K=10 and C=00 and M=00 and Y=00 is the second condition for calculation of the characteristic values by the area characteristic value calculator 13.

(3) The number of pixels which satisfy a third condition, i.e., C=11 and K=00, is calculated. That is, the "number of first C pixels" is calculated. In the processing of the C plane, C=11 and K=00 is the third condition for calculation of the characteristic values by the area characteristic value calculator 13. In the processing of the M plane, M=11 and K=00 is the third condition for calculation of the characteristic values by the area characteristic value calculator 13. The number of pixels which satisfy M=11 and K=00 is referred to as the "number of first M pixels". In the processing of the Y plane, Y=11 and K=00 is the third condition for calculation of the characteristic values by the area characteristic value calculator 13. The number of pixels which satisfy Y=11 and K=00 is referred to as the "number of first Y pixels".

(4) The number of pixels which satisfy a fourth condition, i.e., C=10 and K=00, is calculated. That is, the "number of second C pixels" is calculated. In the processing of the C plane, C=10 and K=00 is the fourth condition for calculation of the characteristic values by the area characteristic value calculator 13. In the processing of the M plane, M=10 and K=00 is the fourth condition for calculation of the characteristic values by the area characteristic value calculator 13. The number of pixels which satisfy M=10 and K=00 is referred to as the "number of second M pixels". In the processing of the Y plane, Y=10 and K=00 is the fourth condition for calculation of the characteristic values by the area characteristic value calculator 13. The number of pixels which satisfy Y=10 and K=00 is referred to as the "number of second Y pixels".

As in the first exemplary embodiment, the area characteristic value calculator 13 calculates the number of first K pixels, which is the number of pixels having a single color of K, and also calculates the number of first C pixels, which is the number of C pixels which do not overlap K. The area characteristic value calculator 13 also calculates the number of second K pixels, which is the number of K pixels having the second highest K density level, and the number of second C pixels, which is the number of C pixels having the second highest C density level. In the two-bit image shown in FIG. 12A, the number of first K pixels is 4, the number of second K pixels is 2, the number of first C pixels is 3, and the number of second C pixels is 2. This result is supplied to the trapping determining unit 14.

The trapping determining unit 14 makes the following two types of determinations on the basis of the results of calculation made by the area characteristic value calculator 13.

(Determination 1)

When one of the following conditions (A) and (B) is satisfied, determination 1 is true:

(A) the number of first K pixels is equal to or greater than a number-of-K-pixels threshold A1; and (B) the number of first K pixels is equal to or greater than a number-of-K-pixels threshold A2 (A2 is equal to or smaller than A1) and the number of second K pixels is equal to or greater than a number-of-K-pixels threshold B1.

(Determination 2)

When one of the following conditions (C) and (D) is satisfied, determination 2 is true:

(C) the number of first C pixels is equal to or greater than a number-of-C-pixels threshold C1; and (D) the number of first C pixels is equal to or greater than a number-of-C-pixels threshold C2 (C2 is equal to or smaller than C1) and the number of second C pixels is equal to or greater than a number-of-C-pixels threshold D1.

When the determination 1 and the determination 2 are both true, the trapping determining unit 14 determines that the pixel of interest is a pixel to be subjected to trapping processing. That is, the trapping determining unit 14 compares the four characteristic values, i.e., the number of first K pixels, the number of second K pixels, the number of first C pixels, and the number of second C pixels, with the six thresholds, so as to determine whether white gaps are noticeable.

Those six thresholds (i.e., the number-of-K-pixels threshold A1, the number-of-K-pixels threshold A2, the number-of-K-pixels threshold B1, the number-of-C-pixels threshold C1, the number-of-C-pixels threshold C2, and the number-of-C-pixels threshold D1) are determined in advance in accordance with the characteristics of two-bit processing and the conditions for trapping processing. In the second exemplary embodiment, the number-of-K-pixels threshold A1 is 3, the number-of-K-pixels threshold A2 is 2, the number-of-K-pixels threshold B1 is 2, the number-of-C-pixels threshold C1 is 1, the number-of-C-pixels threshold C2 is 0, and the number-of-C-pixels threshold D1 is 2.

The result of determination made by the trapping determining unit 14 when the six thresholds are used is the one shown in FIG. 5, as in the first exemplary embodiment. As shown in FIG. 5, the trapping determining unit 14 detects pixels to be subjected to trapping processing in the boundary between the letter (character) and the background of the two-bit image, and supplies the determination result to the pixel-of-interest value determining unit 15.

A description will now be given of a technique for calculating a substitute pixel value for a pixel which is to be subjected to trapping processing.

The substitute pixel value calculator 12 first sets, as shown in FIG. 8A, the positions of reference pixels. The technique for determining the positions of reference pixels is similar to that used in the first exemplary embodiment. The substitute pixel value calculator 12 then calculates the number of C pixels whose pixel values are not "00" (white). In this case, the number of C pixels is calculated for each of the pixel values "01", "10", and "11". Then, the substitute pixel value calculator 12 sets the pixel value which represents the largest number of C pixels to be the substitute pixel value. If the number of C pixels represented by one pixel value is the same as that represented by another pixel value, the substitute pixel value calculator 12 calculates the substitute pixel value by using a predetermined approach, for example, by selecting one of a pixel value representing a darker pixel and a pixel value representing a paler pixel, or by selecting one of a pixel value representing a darker pixel and a pixel value representing a paler pixel in accordance with a condition based on a combination of plural pixel values. In this manner, the substitute pixel value calculator 12 determines the substitute pixel values for all the pixels forming the input two-bit image. By using this calculation technique, the characteristics of cyan (i.e., the regularity of the number of lines per inch and the angle) of the input two-bit image can be maintained as they are.

Then, a technique for determining the value of a pixel of interest will be discussed.

The pixel-of-interest value determining unit 15 determines the value of a pixel of interest to be output from the trapping processor 9 on the basis of the value of the pixel of interest positioned in the input two-bit image, the output value from the trapping determining unit 14, and the output value from the substitute pixel value calculator 12 in accordance with the following conditions (1) through (4).

(1) If the trapping determining unit 14 determines that the pixel of interest is not a pixel to be subjected to trapping processing, the pixel-of-interest value determining unit 15 outputs the value of the pixel of interest positioned in the input two-bit image as it is.

(2) If the trapping determining unit 14 determines that the pixel of interest is a pixel to be subjected to trapping processing and if the output value from the substitute pixel value calculator 12 is "00 (white)", the pixel-of-interest value determining unit 15 outputs the value of the pixel of interest positioned in the input two-bit image as it is.

(3) If the trapping determining unit 14 determines that the pixel of interest is a pixel to be subjected to trapping processing, and if the output value from the substitute pixel value calculator 12 is other than "00" (white)", and if the value of the pixel of interest positioned in the input two-bit image is "00 (white)", the pixel-of-interest value determining unit 15 outputs the output value from the substitute pixel value calculator 12 as the value of the pixel of interest. In this case, the value of the pixel of interest is changed to the substitute pixel value. For example, if the pixel of interest indicates white, which is the color of the background, it is changed to cyan.

(4) If the trapping determining unit 14 determines that the pixel of interest is a pixel to be subjected to trapping processing, and if the output value from the substitute pixel value calculator 12 is other than "00" (white)", and if the value of the pixel of interest positioned in the input two-bit image is other than "00 (white)", the pixel-of-interest value determining unit 15 outputs the value of the pixel of interest positioned in the input two-bit image as it is.

The states of two-bit images which have been subjected to trapping processing are shown in FIGS. 13A and 13B. FIG. 13A illustrates the state of the two-bit image shown in FIG. 12B (i.e., the two-bit image in which the K plane is not displaced from the C plane) which has been subjected to trapping processing. FIG. 13B illustrates the state of the two-bit image shown in FIG. 12B (i.e., the two-bit image in which the K plane is displaced from the C plane by two pixels in the left direction) which has been subjected to trapping processing.

After performing trapping processing, in the two-bit image in which the K plane is not displaced from the C plane, several pixels in which K and C colors are superposed are generated, as shown in FIG. 13A. This is because the pixels which are determined to be subjected to trapping processing by the trapping determining unit 14 are present, not only in the outline of the letter (character), but also in the background. However, because of the processing performed by the substitute pixel value calculator 12 and the pixel-of-interest value determining unit 15, trapping processing does not influence the characteristics (the regularity of the number of lines per inch, the angle, etc.) of cyan (C) of the two-bit image. Thus, problems do not occur.

In the two-bit image in which the K plane is displaced from the C plane by two pixels in the left direction, as shown in FIG. 13B, white gaps do not occur because of trapping processing performed by the trapping processor 9. The processing area determining unit 11, the substitute pixel value calculator 12, the area characteristic value calculator 13, the trapping determining unit 14, and the pixel-of-interest value determining unit 15 perform processing on the magenta (M) plane and the yellow (Y) plane in a manner similar to the processing performed on the cyan (C) plane. As a result, white gaps do not occur around the black letter (character).

Figure 14:
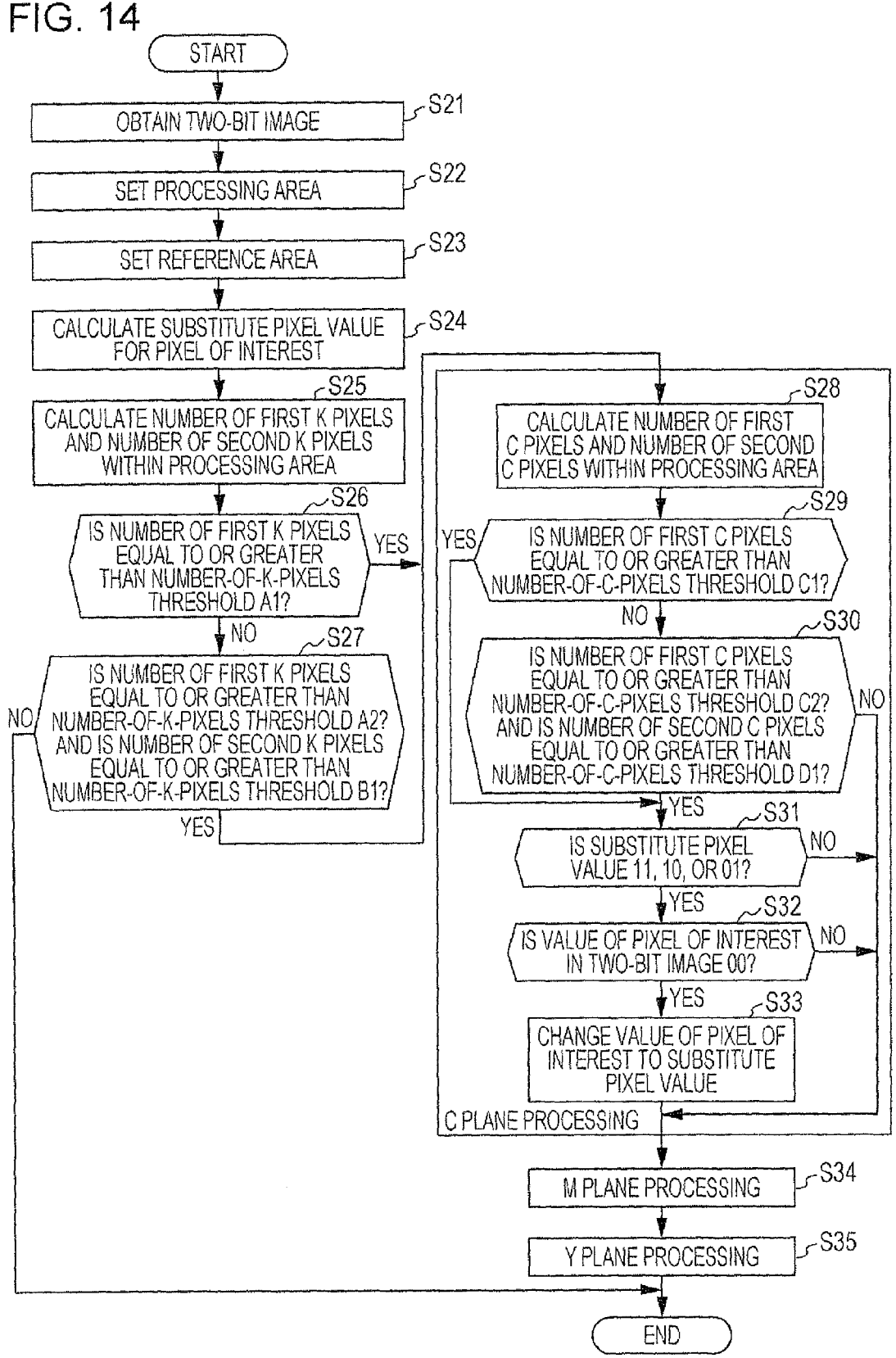
FIG. 14 is a flowchart illustrating processing performed by the trapping processor.

FIG. 14 is a flowchart illustrating processing performed by the trapping processor 9.

In step S21, the processing area determining unit 11 obtains a two-bit image (four-valued image). Then, in step S22, the processing area determining unit 11 sets the processing area 50. In step S23, the substitute pixel value calculator 12 sets the reference area 51 for analyzing the screen structure of the obtained two-bit image. Then, in step S24, the substitute pixel value calculator 12 calculates a substitute pixel value for a pixel of interest from the characteristics of the pixel arrangement of the two-bit image of the reference area 51. In step S25, the area characteristic value calculator 13 calculates the number of first K pixels and the number of second K pixels within the processing area 50. In step S26, the trapping determining unit 14 determines whether the number of first K pixels calculated by the area characteristic value calculator 13 is equal to or greater than the number-of-K-pixels threshold A1. If the result of step S26 is YES, the process proceeds to step 28, which will be discussed later. If the result of step S26 is NO, the process proceeds to step S27. In step S27, the trapping determining unit 14 determines whether the number of first K pixels calculated by the area characteristic value calculator 13 is equal to or greater than the number-of-K-pixels threshold A2 (A2 is equal to or smaller than A1) and also determines whether the number of second K pixels calculated by the area characteristic value calculator 13 is equal to or greater than the number-of-K-pixels threshold B1. If the result of step S27 is NO, the processing is completed. If the result of step S27 is YES, the process proceeds to step S28. In step S28, the area characteristic value calculator 13 calculates the number of first C pixels and the number of second C pixels within the processing area 50.

In step S29, the trapping determining unit 14 determines whether the number of first C pixels calculated by the area characteristic value calculator 13 is equal to or greater than the number-of-C-pixels threshold C1. If the result of step S29 is YES, the process proceeds to step S31. If the result of step S29 is NO, the process proceeds to step S30. In step S30, the trapping determining unit 14 determines whether the number of first C pixels is equal to or greater than the number-of-C-pixels threshold C2 (C2 is equal to or smaller than C1) and also determines whether the number of second C pixels is equal to or greater than the number-of-C-pixels threshold D1. If the result of step S30 is NO, the process proceeds to step S34 in which M plane processing is performed, which will be discussed later. If the result of step S30 is YES, the process proceeds to step S31. In step S31, the pixel-of-interest value determining unit 15 determines whether the output value from the substitute pixel value calculator 12 is other than "00" (i.e., the substitute pixel value="11", "10", or "01"). If the result of step S31 is NO, the process proceeds to step S34 in which M plane processing is performed, which will be discussed later. If the result of step S31 is YES, the process proceeds to step S32. In step S32, the pixel-of-interest value determining unit 15 determines whether the value of the pixel of interest positioned in the input two-bit image is "00". If the result of step S32 is NO, the process proceeds to step S34 in which M plane processing is performed, which will be discussed later. If the result of step S32 is YES, the process proceeds to step S33. In step S33, the pixel-of-interest value determining unit 15 changes the value of the pixel of interest to the substitute pixel value. Steps S28 through S33 are called "C plane processing". After step S33, in step S34, processing similar to the processing of steps S28 through S33 is performed on magenta (M) (M plane processing). In step S35, processing similar to the processing of steps S28 through S33 is performed on yellow (Y) (Y plane processing). The processing is then completed.

As described above, according to the second exemplary embodiment, the following processing is performed. The area characteristic value calculator 13 calculates the characteristic values of the processing area 50, which has been set around a pixel of interest, on the basis of the conditions (i.e., (1) K=11 and C=00 and M=00 and Y=00, (2) K=10 and C=00 and M=00 and Y=00, (3) C=11 and K=00, and (4) C=10 and K=00) set by using combinations of the pixel values of the plural color plates of the pixels contained in the processing area 50. The trapping determining unit 14 then determines, for each of the color plates of the four-valued image subjected to halftone processing, on the basis of the characteristic values calculated by the area characteristic value calculator 13, whether the pixel of interest is a pixel to be subjected to trapping processing. The substitute pixel value calculator 12 sets in the reference area 51, for each of the color plates, the positions of reference pixels which are to be referred to when changing the value of the pixel of interest, and then calculates the value of the pixel of interest on the basis of the pixel values of the reference pixels for each color plate. When the trapping determining unit 14 determines that the pixel of interest is a pixel to be subjected to trapping processing, the pixel-of-interest value determining unit 15 changes the value of the pixel of interest positioned in the four-valued image into the pixel value calculated by the substitute pixel value calculator 12. Thus, by using a simple technique, trapping processing can be applied to a four-valued image subjected to halftone processing.

In known trapping processing, in order to determine whether trapping processing is to be performed on pixels forming a boundary area in which white gaps occur, the use of an eight-bit input image is assumed. Accordingly, it is not possible to apply such known trapping processing to image processing apparatuses in which measures are taken to save the free space of a memory, for example, in which an input image is binarized and is stored, or in which N-value halftone processing is performed on an input image by using an application and the resulting N-valued image is supplied to an output unit. In contrast, the above-described first or second exemplary embodiment is particularly effective for such image processing apparatuses.

Additionally, in the first and second exemplary embodiments, trapping processing is implemented by determining whether trapping processing is to be performed in accordance with conditions set by using combinations of pixel values of the color planes and by using substitute pixel values with which the halftone structure can be maintained. Accordingly, unlike pattern matching processing, a large area is not required to implement high-precision detection for a boundary in which white gaps occur. Thus, trapping processing can be implemented at a low cost without the need for a large memory or circuit.

A storage medium storing therein a software program for implementing the functions of the image processing apparatus 1 may be supplied to the image processing apparatus 1. Then, the CPU 31 may read the program stored in the storage medium and execute the program. In this case, advantages similar to those of the first and second exemplary embodiments can be obtained. Storage media storing the program therein include compact disc-read only memories (CD-ROMs), digital versatile disks (DVDs), secure digital (SD) cards, etc. Alternatively, the CPU 31 may execute the software program for implementing the functions of the image processing apparatus 1, thereby achieving advantages similar to those of the first and second exemplary embodiments.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a characteristic value calculator that calculates characteristic values of a preset area, which has been set around a pixel of interest, on the basis of conditions, each of the conditions being set by using a combination of pixel values of a plurality of color planes of each pixel contained in the preset area;
a trapping determining unit that determines, for each of the plurality of color planes of an N-valued image which has been subjected to halftone processing, on the basis of the characteristic values of the preset area calculated by the characteristic value calculator, whether the pixel of interest is to be subjected to trapping processing;
a pixel value calculator that sets, for each of the plurality of color planes, in a reference area used for analyzing a regularity structure of the N-valued image, a position of a reference pixel which is to be referred to when changing a pixel value of the pixel of interest, and that calculates a pixel value for changing the pixel value of the pixel of interest on the basis of a pixel value of each of the plurality of color planes at the position of the reference pixel and compares a number of reference pixels that are "on" with a predetermined threshold; and
a pixel-of-interest value changing unit that changes the pixel value of the pixel of interest positioned in the N-valued image into the calculated pixel value when the trapping determining unit determines that the pixel of interest is to be subjected to trapping processing.

2. The image processing apparatus according to claim 1, further comprising:
a changing unit that changes a size of the preset area set by the characteristic value calculator in accordance with an input from a user or a specification of an output unit from which the N-valued image is to be output.

3. The image processing apparatus according to claim 1, wherein the reference pixel is set in the reference area at a position that allows the regularity structure of the N-valued image which has been subjected to halftone processing to be maintained even if the pixel value of the pixel of interest is changed.

4. The image processing apparatus according to claim 1, wherein the N-valued image is a binary image which has been subjected to halftone processing.

5. The image processing apparatus according to claim 4, wherein:
the conditions set by using the combinations of the pixel values of the plurality of color planes include a first condition that a pixel value of a first color plane is a maximum value and pixel values of the other color planes including a second color plane are zero and a second condition that the pixel value of the second color plane is a maximum value and the pixel value of the first color plane is zero;
the characteristic value calculator calculates, as the characteristic values of the preset area, the number of first pixels contained in the preset area that satisfy the first condition and the number of second pixels contained in the preset area that satisfy the second condition; and
the trapping determining unit determines that the pixel of interest is to be subjected to trapping processing when the number of first pixels is equal to or greater than a first threshold and the number of second pixels is equal to or greater than a second threshold.

6. The image processing apparatus according to claim 1, wherein the N-valued image is a four-valued image which has been subjected to halftone processing.

7. The image processing apparatus according to claim 6, wherein:
the conditions set by using the combinations of the pixel values of the plurality of color planes include a first condition that a pixel value of a first color plane is a maximum value and pixel values of the other color planes including a second color plane are zero, a second condition that the pixel value of the first color plane is a second greatest value and the pixel values of the other color planes including the second color plane are zero, a third condition that the pixel value of the second color plane is a maximum value and the pixel value of the first color plane is zero, and a fourth condition that the pixel value of the second color plane is a second greatest value and the pixel value of the first color plane is zero;
the characteristic value calculator calculates, as the characteristic values of the preset area, the number of first pixels contained in the preset area that satisfy the first condition, the number of second pixels contained in the preset area that satisfy the second condition, the number of third pixels contained in the preset area that satisfy the third condition, and the number of fourth pixels contained in the preset area that satisfy the fourth condition; and
the trapping determining unit determines that the pixel of interest is to be subjected to trapping processing (i) when the number of first pixels is equal to or greater than a first threshold, or (ii) when the number of first pixels is equal to or greater than a second threshold, the second threshold being equal to or smaller than the first threshold, and when the number of second pixels is equal to or greater than a third threshold, and (iii) when the number of third pixels is equal to or greater than a fourth threshold, or (iv) when the number of third pixels is equal to or greater than a fifth threshold, the fifth threshold being equal to or smaller than the fourth threshold, and when the number of fourth pixels is equal to or greater than a sixth threshold.

8. An image processing method to be performed by at least one computer processing unit, comprising:
calculating characteristic values of a preset area, which has been set around a pixel of interest, on the basis of conditions, each of the conditions being set by using a combination of pixel values of a plurality of color planes of each pixel contained in the preset area;
determining, for each of the plurality of color planes of an N-valued image which has been subjected to halftone processing, on the basis of the calculated characteristic values of the preset area, whether the pixel of interest is to be subjected to trapping processing;
setting, for each of the plurality of color planes, in a reference area for analyzing a regularity structure of the N-valued image, a position of a reference pixel which is to be referred to when changing a pixel value of the pixel of interest;

calculating a pixel value for changing the pixel value of the pixel of interest on the basis of a pixel value of each of the plurality of color planes at the position of the reference pixel and compares a number of reference pixels that are "on" with a predetermined threshold; and changing the pixel value of the pixel of interest positioned in the N-valued image into the calculated pixel value when it is determined that the pixel of interest is to be subjected to trapping processing.

9. A non-transitory computer readable medium storing a program causing a computer to execute a process, the process comprising:

calculating characteristic values of a preset area, which has been set around a pixel of interest, on the basis of conditions, each of the conditions being set by using a combination of pixel values of a plurality of color planes of each pixel contained in the preset area;

determining, for each of the plurality of color planes of an N-valued image which has been subjected to halftone processing, on the basis of the calculated characteristic values of the preset area, whether the pixel of interest is to be subjected to trapping processing;

setting, for each of the plurality of color planes, in a reference area for analyzing a regularity structure of the N-valued image, a position of a reference pixel which is to be referred to when changing a pixel value of the pixel of interest;

calculating a pixel value for changing the pixel value of the pixel of interest on the basis of a pixel value of each of the plurality of color planes at the position of the reference pixel and compares a number of reference pixels that are "on" with a predetermined threshold; and changing the pixel value of the pixel of interest positioned in the N-valued image into the calculated pixel value when it is determined that the pixel of interest is to be subjected to trapping processing.

* * * * *